(12) United States Patent
Oja et al.

(10) Patent No.: US 11,372,461 B2
(45) Date of Patent: Jun. 28, 2022

(54) CIRCUITRY FOR TRANSFERRING DATA ACROSS RESET DOMAINS

(71) Applicant: Nordic Semiconductor ASA, Trondheim (NO)

(72) Inventors: Ari Oja, Oulu (FI); Åsmund Holen, Trondheim (NO); Arne Wanvik Venås, Trondheim (NO); Knut Austbø, Trondheim (NO); Ragnar Haugen, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 17/237,324

(22) Filed: Apr. 22, 2021

(65) Prior Publication Data

US 2021/0333852 A1 Oct. 28, 2021

(30) Foreign Application Priority Data

Apr. 23, 2020 (GB) ..................................... 2005960

(51) Int. Cl.
*G06F 1/24* (2006.01)
*G06F 1/08* (2006.01)
*G06F 1/12* (2006.01)
*G06F 13/40* (2006.01)

(52) U.S. Cl.
CPC .................. *G06F 1/24* (2013.01); *G06F 1/08* (2013.01); *G06F 1/12* (2013.01); *G06F 13/4054* (2013.01)

(58) Field of Classification Search
CPC ..... G06F 1/24; G06F 1/08; G06F 1/12; G06F 13/4054
See application file for complete search history.

(56) References Cited

U.S. PATENT DOCUMENTS

| 7,003,423 B1* | 2/2006 | Kabani | .................... G06F 1/12 713/502 |
|---|---|---|---|
| 2006/0190754 A1* | 8/2006 | Dargelas | ............. G06F 13/4054 713/400 |
| 2013/0073890 A1 | 3/2013 | Lin | |

(Continued)

FOREIGN PATENT DOCUMENTS

WO WO2019/106225 A1 6/2019

OTHER PUBLICATIONS

IPO Search Report under Section 17(5) for United Kingdom application No. GB2005960.6, dated Feb. 9, 2021, 3 pages.

*Primary Examiner* — Zahid Choudhury
(74) *Attorney, Agent, or Firm* — Klarquist Sparkman, LLP

(57) ABSTRACT

An integrated-circuit device comprises a source register in a reset domain, a destination circuit outside the reset domain, and a reset checking circuit. The checking circuit comprises a buffer outside the reset domain for receiving data values output by the source register, a reset detector, and reset checking logic. The checking logic detects a new data value output by the source register, checks whether a reset of the reset domain has been detected, and contingently outputs a control signal for controlling whether the destination circuit receives the new data value from the buffer. The reset detector signals whether a reset has been detected by using a feedback path to hold a predetermined value in a resettable latch until the latch receives a reset signal, and to hold a different value in the latch after receiving a reset signal.

20 Claims, 4 Drawing Sheets

(56) References Cited

U.S. PATENT DOCUMENTS

| | | | |
|---|---|---|---|
| 2014/0351570 A1* | 11/2014 | Chowdhury | G06F 9/30141 713/1 |
| 2015/0022252 A1 | 1/2015 | Venas | |
| 2016/0027484 A1* | 1/2016 | Matsuo | G11C 29/789 365/189.17 |
| 2016/0048155 A1* | 2/2016 | Gupta | G06F 1/24 327/142 |
| 2016/0085279 A1* | 3/2016 | Culshaw | G06F 11/1441 327/142 |
| 2018/0189156 A1* | 7/2018 | Hu | G06F 1/28 |
| 2020/0192447 A1* | 6/2020 | Paterson | G06F 1/3287 |

* cited by examiner

CIRCUITRY FOR TRANSFERRING DATA ACROSS RESET DOMAINS

CROSS-REFERENCE TO RELATED APPLICATION

This application claims priority from United Kingdom Patent Application No. GB2005960.6, filed Apr. 23, 2020, which application is incorporated herein by reference in its entirety.

BACKGROUND OF THE INVENTION

This invention relates to integrated-circuit devices comprising circuitry for transferring data across reset domains.

Many integrated-circuit (IC) devices, such as microcontrollers, are configured to reset to a known state under particular conditions. These conditions may include: if a processor encounters an illegal instruction; once the supply voltage has stabilised at power on (a "power-on reset"); upon detecting a power brown-out; if a watchdog timer triggers due to a lockup on the device; or when an external reset pin is asserted (e.g. by a user pressing a physical reset button of an apparatus that incorporates the IC device).

Reset logic on the device may issue a reset signal to components (e.g. D-type flip-flops) within a reset domain along a reset path. Reset paths are often untimed—i.e. they not synchronized to a clock signal that is also provided to the components.

Some more complex IC devices, such as systems-on-chip (SoCs), may define a plurality of reset domains that can be reset somewhat independently of one another. For example, a SoC may contain a plurality of microcontroller units (MCU), each containing a respective general-purpose processor or digital signal processor (DSP), with a slave one of the MCUs being resettable independently of a master one of the MCUs.

A problem can arise in a multi-domain device if data is crossing from a first reset domain to a second reset domain—e.g. over a data bus from a slave MCU to a master MCU—around the time the first reset domain is reset, but where the second reset domain is not reset. The resetting of the first reset domain may result in metastability at a destination register in the second reset domain. This metastability can lead to data corruption in the destination register, resulting in unpredictable or erroneous behaviour of the device.

It is known to mitigate the problem of metastability due to reset domain crossings (RDC) by gating the clock of the destination reset domain whenever a reset of the source reset domain is signalled. However, such clock gating is not always desirable as it can prevent processes in the destination reset domain from executing in a timely manner.

Embodiments of the present disclosure therefore seek to provide a different approach.

SUMMARY OF THE INVENTION

From one aspect, the invention provides an integrated-circuit device comprising:
  a source register in a first reset domain;
  a destination circuit located outside the first reset domain; and
  a reset checking circuit;
wherein the reset checking circuit comprises:
  a buffer located outside the first reset domain and arranged for receiving data values output by the source register;
  a reset detector for detecting a reset of the first reset domain; and
  reset checking logic, located outside the first reset domain,
wherein the reset checking logic is configured to:
  detect a new data value output by the source register, and, in response, to check whether a reset of the first reset domain has been detected by the reset detector; and
  output, in dependence on whether a reset of the first reset domain has been detected by the reset detector, a control signal for controlling whether the destination circuit receives the new data value from the buffer.

Thus it will be seen that, in accordance with some embodiments, a data value output by the source register in the first reset domain is buffered outside the first reset domain data, while a check is made to determine if a reset of the first reset domain has occurred. If such a reset is detected, a control signal is output that may be used to prevent the destination circuit from receiving a data value that is potentially metastable (i.e. comprising an intermediate voltage not equal to logic low or to logic high).

Conversely, when the control signal indicates that no reset of the first reset domain has been detected by the reset detector, the destination circuitry may be configured to read the new data value from the buffer. In this way, it is possible to ensure that only reliable data values pass from the source register, in the first reset domain, to the destination circuit, outside the first reset domain.

The destination circuit may comprise a destination register. The destination circuit may comprise data flow logic configured to read a data value from the buffer into the destination register when a control signal output by the reset checking logic indicates that no reset of the first reset domain has been detected. The control signal may be a binary signal—e.g. being low when a reset has been detected and high when a reset has not been detected (or vice versa). The data flow logic may be configured not to read the data value from the buffer into the destination register when the control signal output by the reset checking logic indicates that a reset of the first reset domain has been detected. It may comprise a switch for allowing or blocking a data value output by the buffer from being received by the destination register. In some embodiments, the data flow logic may be further configured to output a ready (or acknowledgement) signal to the reset checking logic, for indicating when the destination circuit is ready to read a data value. This may be used for handshaking synchronization when, as in some embodiments, the buffer is in a different clock domain from the destination circuit. The reset checking logic may be configured to cause the buffer to hold a data value in the buffer at least until a ready (or acknowledgement) signal is received by the reset checking logic from the destination circuit.

In some embodiments, the buffer is connected to the destination circuit by a bus. The reset checking logic and the destination circuit may together comprise a bus synchronizer. The reset checking logic may be a source component of the bus synchronizer. The destination circuit may comprise a receiver component of the bus synchronizer. The control signal output by the reset checking logic may serve as a transfer request instruction for the bus synchronizer.

The buffer and the reset checking logic may both be located in a second reset domain, different from the first reset domain. The destination circuit may also be in the second reset domain.

The buffer may be configured to hold each new data value it receives from the source register while the reset checking logic checks whether a reset of the first reset domain has been detected by the reset detector. The buffer may comprise a buffer register, which may comprise one or more flip-flops. The buffer may comprise a feedback path for holding a data value in the buffer while the reset checking logic checks for a reset. The feedback path may be configured to be selectively enabled and disabled by the reset checking logic. In some embodiments, the buffer may comprise a multiplexer arranged to output to a buffer register. The multiplexer may be arranged to receive data values output by the source register at a first input, and to receive an output of the buffer at a second input (i.e. for creating a feedback loop). A select line of the multiplexer may be connected to the reset checking logic, which may use the select line to set the multiplexer for receiving a new data value from the source register into the buffer at a first time (e.g. after detecting the new data value being output by the source register), and for holding a data value in the buffer over a plurality of clock cycles at a second time (e.g. while checking for a reset).

The reset detector may be located at least partly in the first reset domain. In particular, it may comprise a resettable latch, which may be located in the first reset domain—e.g. comprising a D-type flip-flop having an asynchronous clear input which may be arranged to receive a reset signal from reset control logic for the first reset domain. An output of the resettable latch may be connected, directly or indirectly, to an input of the reset checking logic. In some embodiments, the reset detector comprises a synchronizer, which may comprise a set of flip-flops (e.g. two flip-flops) connected in series. The synchronizer may be arranged to receive an output of the resettable latch and may be arranged to output a signal to the reset checking logic. This synchronizer can help to ensure the reset checking logic receives a reliable indication of a reset of the first reset domain, without metastability concerns due to the asynchronous nature of the reset.

The reset detector may be configured to output a signal to the reset checking logic representative of whether a reset has been detected. The reset detector may comprise a feedback path for holding a predetermined value (e.g. logic low) in a resettable latch until the latch receives a reset signal. The feedback path may configured to be selectively enabled and disabled by the reset checking logic. In some embodiments, the reset detector may comprise a multiplexer arranged to output to the resettable latch. The multiplexer may be arranged to receive the predetermined value (e.g. logic low) at a first input, and to receive an output of the resettable latch at a second input (i.e. for creating a feedback loop). A select line of the multiplexer may be connected to the reset checking logic, which may use the select line to set the multiplexer for receiving the predetermined value into the resettable latch at a first time (e.g. to initialise the detector after detecting the new data value being output by the source register), and for holding the predetermined value in the resettable latch using the feedback path, until the resettable latch is reset, at a second time. When the resettable latch is reset, the value of its output may change to a reset value (e.g. to logic high), and the feedback path may hold this reset value in the resettable latch for a time, e.g. until the reset checking logic re-initialises the reset detector to the predetermined value.

The reset detector may be re-initialised (e.g. by the reset checking logic) for each successive data value of a succession of data values output by the source register. The reset detector may thus be configured to detect if a reset of the first reset domain occurs since the preceding data value of the succession was output by the source register. The reset detector may be configured to detect a reset of the first reset domain occurring during the entire period between successive data values being output by the source register, or it may be configured to detect a reset only during a shorter detection interval within this period. The reset checking logic may be configured to re-initialise the reset detector in response to detecting a change of data value in the source register.

Each data value may be a single bit, or each data value may comprise a plurality of bits (e.g. a 32-bit word), which may be received by the buffer over a corresponding plurality of parallel data lines. The buffer may then comprise a corresponding plurality of flip-flops arranged in parallel.

The destination circuit may be in the same clock domain as the source register. The reset checking circuit may also be in the same clock domain. However, in some embodiments, the source register is in a first clock domain and the destination circuit is in a second, different clock domain. The first and second clock domains may be asynchronous. Some or all of the reset checking circuit (e.g. the buffer) may be in the first clock domain.

The reset checking circuit may comprise one or more synchronizers. These may help avoid metastability in logic gates within the reset checking circuit, e.g. due to an asynchronous reset of the first reset domain. Each synchronizer may comprise a respective set (e.g. a pair) of flip-flops connected in series.

The reset checking logic may detect a new data value output by the source register in any appropriate way. In some embodiments, the reset checking logic comprises logic for comparing an output of the source register with an output of the buffer. It may comprise an XOR gate arranged to receive an output of the source register at a first input of the XOR gate and to receive an output of the buffer at a second input of the XOR gate. The output of the XOR gate may be connected, directly or indirectly, to an input of the reset checking logic. In some embodiments, the output is connected to the reset checking logic via a synchronizer, which may comprise a set of flip-flops (e.g. two flip-flops) connected in series. This synchronizer can help to ensure a stable output from the XOR gate when the source register is reset.

The reset checking logic may implement a finite state machine (FSM). The FSM may have an idle state in which it is ready to detect a new data value output by the source register. It may have a wait state, reached from the idle state when the FSM receives a signal from the reset detector indicating the detection of a new data value, in which the FSM remains for at least a predetermined delay period. In some embodiments, the FSM may additionally require an acknowledgement signal for a preceding data value to have been received by the reset checking logic before moving from the idle state to the wait state. It may have a checking state, reached from the wait state, in which it checks whether a reset of the first reset domain has been detected by the reset detector. It may have a push state, reached from the checking state when no reset has occurred, in which it outputs the control signal for causing the destination circuit to receive the new data value from the buffer. When a reset has occurred, the FSM may move from the checking state back to the wait state.

The reset checking logic may comprise a counter, which it may use to time a delay period. The FSM may stay in a wait state until the delay period elapses. This delay period may provide time to determine reliably whether a reset of the first reset domain has occurred. The delay period may be equal to or greater than a maximum time interval between the FSM entering the wait state and the reset detector (including any synchronizer) outputting a signal representative of a detected reset, when a reset has occurred. The delay period may equal a number of clock periods greater than or equal to the number of flip-flops arranged in series between an output of a resettable latch in the reset detector and an input to the reset checking logic—for example, where the reset detector contains a two-flip-flop synchronizer at the output of a resettable flip-flop, the reset checking logic may use the counter to wait two or three clock cycles before checking the output of the reset detector. It may, for instance, use the counter to wait two clock cycles by counting one clock cycle with the counter, plus an additional clock cycle from switching state.

The integrated-circuit device may be an IC chip, e.g. a silicon chip. It may be a system-on-chip (SoC). It may comprise one or more reset controllers, each configured to issue a reset signal over a respective reset path. It may be incorporated within a larger apparatus, such as a wireless sensor device. It may be connected or connectable to one or more clock sources, such as an off-chip crystal oscillator. It may be connected or connectable to a power supply, such as a battery. References herein to a circuit or circuitry should be understood as encompassing circuit portions which may be open circuits—e.g. only becoming closed circuits when the device is connected to a suitable external power supply.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
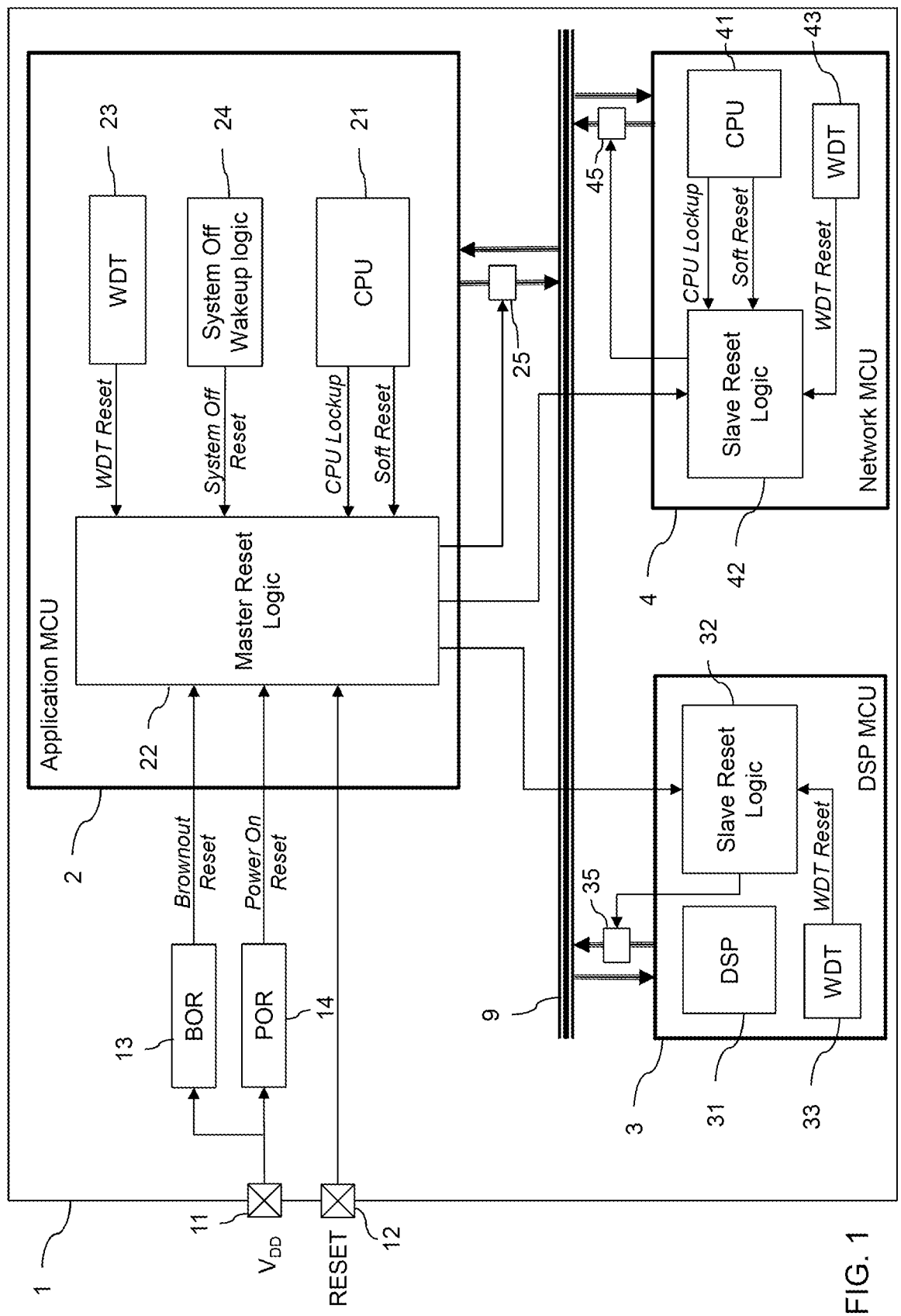
FIG. 1 is a schematic drawing of a system-on-chip (SoC) embodying the invention.

FIG. 1 shows elements of an integrated-circuit system-on-chip (SoC) 1 that embodies the invention.

The SoC 1 comprises an application micro-controller unit (MCU) 2, a digital signal processing (DSP) MCU 3, and a Network MCU 4. The Network MCU 4 could, for example, include a radio transceiver such as a Bluetooth Low Energy™ radio. The Application MCU 2 contains a CPU 21 for executing a main software application. The Network MCU also contains its own CPU 31 for executing network communication libraries. The DSP MCU 3 contains a DSP 31 for performing intensive calculations such as floating-point arithmetic. The MCUs 2, 3, 4 can exchange data with each other, and with a non-volatile memory (not shown), over a bus system 9.

Other standard components of an SoC such as volatile and non-volatile memory, peripherals, interfaces, power management, clock management, etc. are omitted from FIG. 1 for simplicity but may be present in the SoC 1. Instead, FIG. 1 focuses in particular on elements of the reset system.

The MCUs 2, 3, 4 may be in different asynchronous clock domains. For example, the Network MCU 4 may be clocked by a low-power RC oscillator during a sleep state, while the Application MCU 2 is clocked by a crystal oscillator.

The MCUs 2, 3, 4 are also in different respective reset domains. The Application MCU 2 contains a master reset logic block 22, while the DSP 3 and Network 4 MCUs contain respective slave reset logic blocks 32, 42.

The SoC 1 receives power from an external source at a $V_{DD}$ pin 11. The SoC 1 also has a reset pin 12.

The master reset logic block 22 receives inputs from a system-level brownout reset (BOR) generator 13, a system-level power-on reset (POR) generator 14, the reset pin 12, a local watchdog timer (WDT) 23, a system-off wakeup logic block 24, and the application CPU 21. The CPU 21 can signal a CPU lockup or a soft reset to the master reset logic 22.

The DSP slave reset logic 32 receives an input from a local watchdog timer (WDT) 33 and from the master reset logic 22. The Network slave reset logic 42 receives inputs from a local watchdog timer (WDT) 43, the Network CPU 41 (CPU lockup and soft reset), and from the master reset logic 22.

There are multiple sources that can trigger different types of resets in the SoC 1. In general there are two types of reset sources: system-level and MCU level. A system-level reset will reset all MCUs 2, 3, 4, while a MCU-level reset will reset only parts of, or a whole, MCU 2, 3, 4. Power-on-reset and brown-out-reset are system-level resets, while soft reset, CPU lockup and watchdog timers resets are MCU-level resets.

The Application MCU 2 acts as the master MCU for resets, controlling the reset behaviour of the two slave MCUs: DSP 3 and Network 4. After a system-level reset, the Application MCU 2 will start first and is responsible for starting the slave MCUs 3, 4 as required.

By way of example, the power-on reset (POR) generator 14 initializes the system at power-on. The system is held in reset state until the electrical supply at the $V_{DD}$ pin 11 has reached the minimum operating voltage and the internal voltage regulators have started. After a power-on-reset, the Application MCU 2 is started, while the Network and DSP MCUs 3, 4 are held in reset.

For certain resets of the Application MCU 2, such as a soft reset, the master reset logic 22 may be configured to reset the slave MCUs 3, 4 also. However, a soft reset in a slave MCU 3, 4 will typically cause only that particular MCU to reset.

In order to synchronise messages across the different respective clock domains, the bus system 9 implements bus synchronization through a handshaking protocol.

Each MCU 2, 3, 4 is associated with a respective reset-domain crossing (RDC) checker 25, 35, 45. These act to prevent metastability when data leaves an MCU 2, 3, 4 for the bus system 9, in the case that the source domain (e.g. Application MCU 4) undergoes a reset, but the destination domain (e.g. Network MCU 2) is not to be reset. They are positioned to intercept outgoing data from the MCUs 2, 3, 4, heading towards the bus system 9. In some embodiments, the SoC 1 may have additional, similar RDC checkers located at other reset-domain crossing points; this could include points inside an MCU or elsewhere in the design.

Each RDC checker 25, 35, 45 receives a reset signal from the reset logic 22, 32, 42 of its associated MCU 2, 3, 4. However, most of the logic in the RDC checker 25, 35, 45 is in a different reset domain, outside the reset domain of its associated MCU 2, 3, 4. The RDC checker 25 is shown in greater detail in FIG. 2. The other RDC checkers 35, 45 are of the same design.

Figure 2:
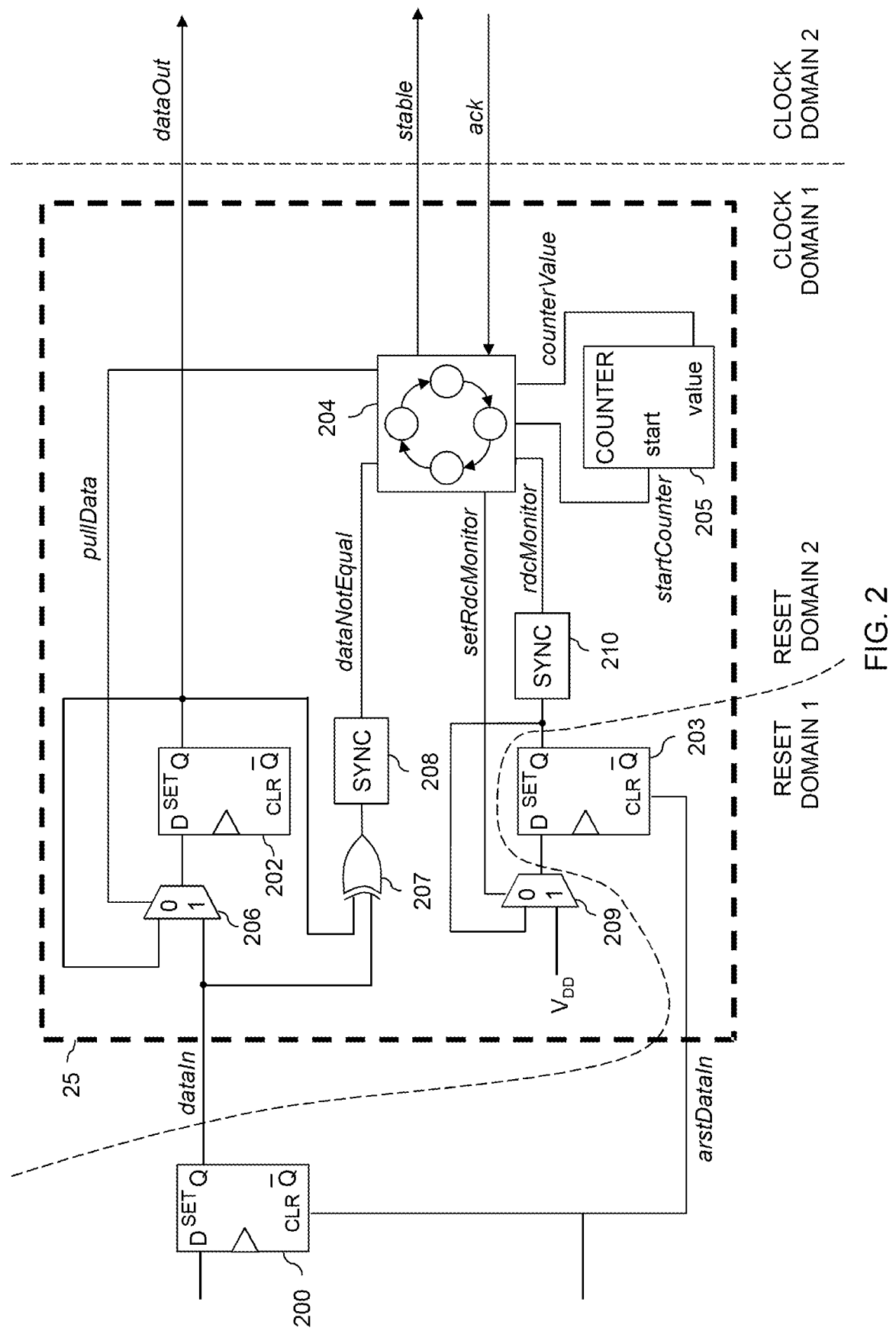
FIG. 2 is a schematic diagram of a reset-domain crossing (RDC) checker in the SoC.

FIG. 2 shows an illustrative data source flip-flop 200 located in the Application MCU 2. This could be a single-bit register, but in some embodiments the flip-flop 200 represents a multi-bit register comprising a plurality of individual parallel flip-flops. This source flip-flop 200 outputs a dataIn signal to the RDC checker 25. In multi-bit embodiments, the dataIn signal may be carried over a plurality of parallel lines. In this example, the RDC checker 25 is in the same clock domain as the Application MCU 2. The RDC checker 25 also has an output interface to synchronization logic in the bus system 9. which, in this example, is in a second clock domain, asynchronous with the first clock domain. The output interface consists of a dataOut line (or lines) for outputting reset-safe data received previously on the dataIn line (or lines), as well as two handshaking lines: an outgoing stable line and an incoming ack line.

Internally, the RDC checker 25 comprises a D-type buffer flip-flop 202 (or multi-bit register in some embodiments), and a D-type reset-detecting flip-flop 203. The operation of the RDC checker 25 is coordinated by a clocked finite state machine (FSM) 204; this may be implemented using flip-flops and logic gates. The RDC checker 25 also comprises a counter 205, a two-input buffer-input mux 206 (or plurality of muxes in multi-bit embodiments), an XOR gate 207 (or plurality of XOR gates in multi-bit embodiments), a data-check synchronizer 208, a two-input reset-input mux 209, and a reset-check synchronizer 210.

The dataIn line is connected to the "1" input of the buffer-input mux 206. The buffer-input mux 206 outputs to the D input of the buffer flip-flop 202. The "0" input of the buffer-input mux 206 is connected to the Q output of the buffer flip-flop 202. The Q output of the buffer flip-flop 202 is also connected to the dataOut line. Thus, when the buffer-input mux 206 is set to the "0" input, a feedback loop feeds the Q output of the buffer flip-flop 202 back to the data input D of the buffer flip-flop 202. In multi-bit embodiments, this structure is reproduced in parallel for each separate dataIn line. The select line of the buffer-input mux 206 (or a common select line for a plurality of parallel buffer-input muxes) is connected to the FSM 204, for receiving a pullData signal. When a high pullData pulse is sent to the mux 206 (or muxes), the buffer flip-flop 202 (or multi-bit register) will read a new value from the dataIn line (or lines), which will then be held until pullData is next pulsed high.

The Q output of the buffer flip-flop 202 is also connected to a first input of the XOR gate 207. The dataIn line is connected to its second input. Thus, the output of the XOR gate 207 will go high whenever dataIn differs from the current dataOut. In multi-bit embodiments, the outputs of a plurality of XOR gates, corresponding to the plurality of buffer flip-flops, are connected through an OR gate, so that the output of the OR gate will go high whenever dataIn differs from the current dataOut in at least one bit position. The XOR gate 207 (or OR gate) outputs to the data-check synchronizer 208, which comprises two D-type flip-flops in series. This data-check synchronizer 208 introduces a delay of one to two clock cycles, but avoids creating metastability in the FSM 204 when the source flip-flop 200 is asynchronously reset. The data-check synchronizer 208 outputs a dataNotEqual signal to the FSM 204, which goes high after the value of dataIn changes.

The reset-detecting flip-flop 203 is in the reset domain of its associated MCU 2. Its clear input CLR is connected to the master reset logic 22 and receives an asynchronous reset signal arstDataIn when the Application MCU 2 is reset. The other flip-flops in the RDC checker 25, including the buffer flip-flop 202 and those in the synchronizers 208, 210 and FSM 204, are connected to a separate reset path, belonging to a different reset domain. This other reset domain would typically be the reset domain of the destination, but it could, in some embodiments, be a third reset domain so long as it can never experience a reset without the destination domain also being reset.

The reset-detecting flip-flop 203 receives a data input D from the reset-input mux 209. The reset-input mux 209 has a "0" input that is connected to the Q output of the reset-detecting flip-flop 203. Thus, when the reset-input mux 209 is set to the "0" input, a feedback loop feeds the Q output of the reset-detecting flip-flop 203 back to the data input D of the reset-detecting flip-flop 203. The select line of the reset-input mux 209 is connected to the FSM 204, for receiving a setRdcMonitor signal. The "1" input of the reset-input mux 209 is connected to $V_{DD}$—i.e. a constant logic high signal. Thus, when a high setRdcMonitor pulse is sent to the mux 209, the reset-detecting flip-flop 203 will be set high (i.e. will be initialised), and will hold this value until it receives a reset signal from the master reset logic 22 of the Application MCU 2, after which it will hold a logic low value until it is re-initialised.

The Q output of the reset-detecting flip-flop 203 is also connected to the reset-check synchronizer 210, which comprises two D-type flip-flops in series. This reset-check synchronizer 210 introduces a delay of one to two clock cycles, but avoids creating metastability in the FSM 204 when the reset-detecting flip-flop 203 receives an asynchronous reset signal. The reset-check synchronizer 210 outputs a rdcMonitor signal to the FSM 204, which will be high if no reset has been detected, and which will go low within two clock cycles of a reset of the Application MCU 2. If a reset has occurred, the feedback loop will then keep rdcMonitor low until the detector is re-initialised by the FSM 204 pulsing the setRdcMonitor line.

The FSM 204 is connected to the counter 205 (a timer) by a startCounter input, which it uses to initialise the counter to zero and start it counting clock cycles. The FSM 204 receives a counterValue output from the counter 205 at each clock cycle, encoding the number of clock cycles elapsed since the counter 205 was last initialised.

Figure 3:
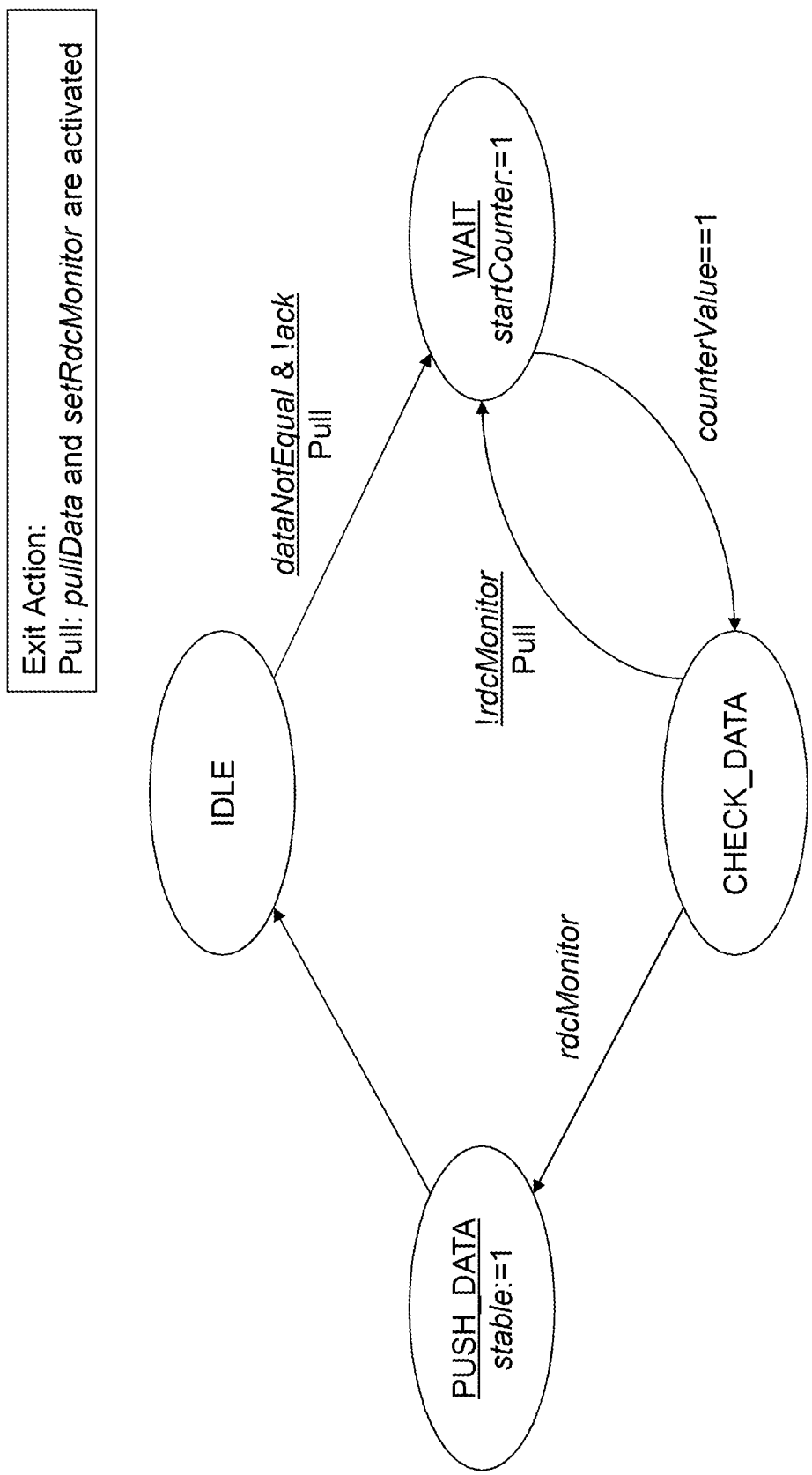
FIG. 3 is a state machine diagram of logic within the RDC checker.

FIG. 3 shows how the FSM 204 controls the issuing of its output signals, pullData, setRdcMonitor, startCounter and stable, in response to its current state and the input signals, dataNotEqual, rdcMonitor, counterValue and ack.

The FSM 204 moves from an IDLE state to a WAIT state when dataNotEqual is high and when asynchronous ack signal line is low. So long as the bus synchronizer received component is indicating that it is ready to read the next dataOut value, by holding ack low, this state transition will occur two clock cycles after a new dataIn value is output by the source flip-flop 200, due to the two-cycle delay introduced by the data-check synchronizer 208.

When exiting the IDLE state to the WAIT state, the FSM 204 performs a Pull action, which comprises pulsing pullData and setRdcMonitor high (i.e. setting them high for one clock cycle only). This causes the new dataIn value to be read into the buffer flip-flop 202 (and then held there over subsequent clock cycles). It also re-initialises the reset-detector flip-flop 203, if it is not already initialised, so that it is ready to detect a reset signal on the arstDataIn line.

On entering the WAIT state, the FSM 204 initialises the counter 205 by pulsing startCounter. It exits the WAIT state for the CHECK_DATA state when counterValue equals one.

(In other embodiments the FSM could wait longer, e.g. waiting two or more cycles, but this is not necessary.) The counter 205 thereby ensures that the FSM 204 does not check the rdcMonitor line for a delay period of three clock cycles after dataOut changes. This provides time for an asynchronous reset of the reset-detecting flip-flop 203 to propagate through the reset-check synchronizer 210 and for rdcMonitor to go low if a reset of the first reset domain occurs while the new data value is being read into the buffer flip-flop 202.

The FSM 204 can exit the CHECK_DATA state either to the WAIT state, which it does if rdcMonitor is low (signalling a reset was detected during the delay period), or to a PUSH_DATA state, which it does if rdcMonitor is high (signalling that no reset was detected during the delay period). If it exits back to the WAIT state, it performs the Pull action again, to read a new data value into the buffer flip-flop 202. The previous data value, which could have been corrupted due to metastability, will be abandoned. If it enters the PUSH_DATA state, the FSM 204 pulses the stable line to the bus synchronizer high, signalling for the data presented on the dataOut to be read out and passed on to its destination (e.g. to Network MCU 4). The stable line thus functions as a "request" line for the bus synchronizer.

After the PUSH_DATA state, the FSM 204 moves directly to the IDLE state, ready to respond to new incoming data once the current bus transfer has been acknowledged.

The FSM 204 may also perform other actions relating to the bus synchronization, which are omitted here for simplicity. For instance, it will set stable low when it observes ack synchronized high.

Figure 4:
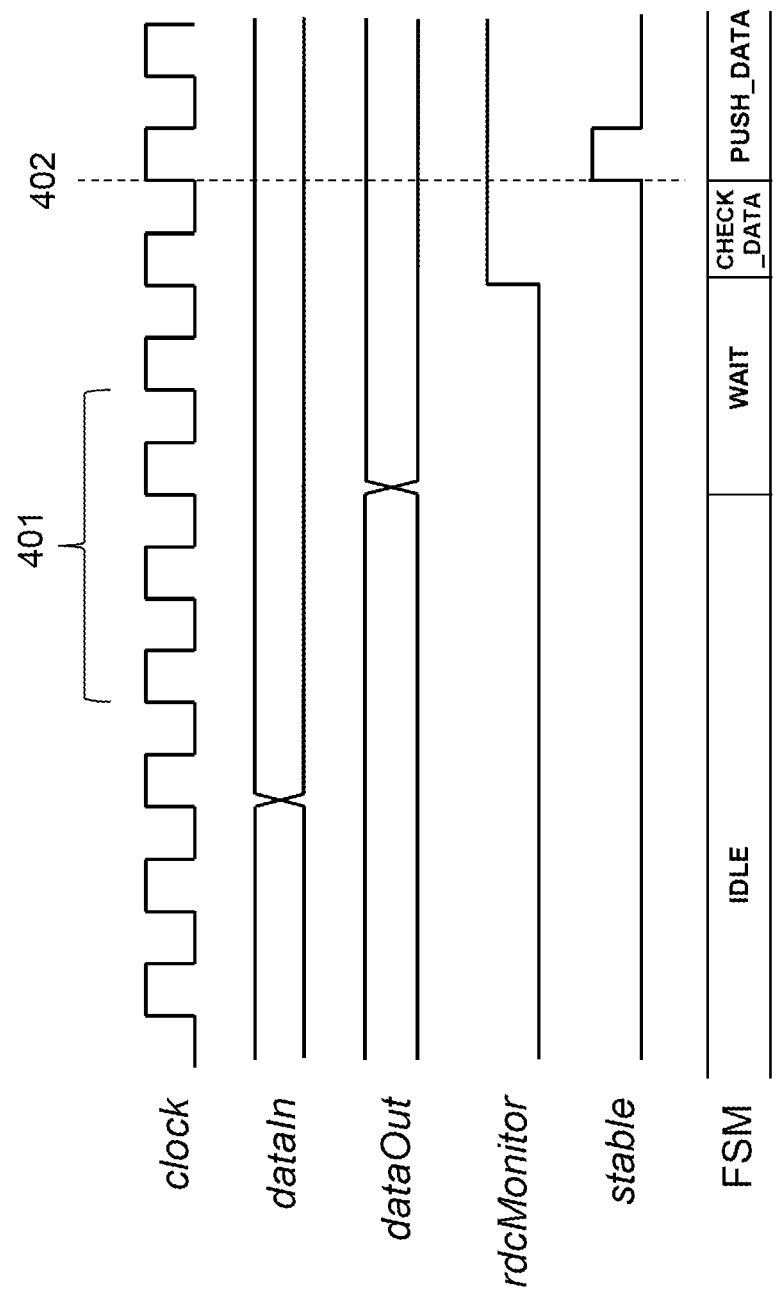
FIG. 4 is a timing diagram for the RDC checker.

FIG. 4 shows the timing of an exemplary detection, by the RDC checker 25, of a reset of the first reset domain.

The clock corresponds to the first clock domain, in which both the source flip-flop 200 and the RDC checker 25 reside. The bus data rate is lower than the clock rate, such that each data value is maintained over several clock cycles. If the receiver in the second clock domain is much slower than the RDC checker 25, such that the RDC checker 25 has to wait for each ack signal, then the bus data rate will be determined by the receiver. However, if the receiver is much faster than the RDC checker 25, then ten clock cycles will be required for the RDC checker 25 to be ready for the next transfer after an initial change on dataIn.

In FIG. 4, first, the dataIn line value changes as new data is output by the source flip-flop 200. This occurs while the FSM 204 is in the IDLE state. Normally, as in this example, no source reset will be activated while the source flip-flop 200 is sampled.

Next, after two clock cycles, the FSM 204 detects that dataNotEqual has gone high and pulses pullData so that the value from dataIn is transferred to the dataOut line. However, the FSM 204 continues to hold the stable line low until it has checked the reset detector has been checked, so that if the value on dataOut is metastable, the FSM 204 can prevent it from being read out by the receiver component.

The FSM 204 also pulses setRdcMonitor at the same time as pullData, to initialise the reset detector flip-flop 203 to logic high, if it is not already storing logic high. It then enters the WAIT state and starts the counter 205.

Assuming no reset is signalled on the arstDataIn line, the rdcMonitor will go high, or will remain high, two clock cycles later (allowing for the two-clock cycle delay introduced by the reset-check synchronizer 210). FIG. 4 shows rdcMonitor as being low initially, which would be the case if a reset had occurred during or since the preceding transfer. More typically, however, rdcMonitor will simply remain high throughout the whole transfer cycle, assuming that no reset is activate before or during the cycle.

The dashed line 402 shows the time at which the FSM 204 checks rdcMonitor, once the value of the counter 205 has reached "1", three clock cycles after the FSM 204 entered the WAIT state.

However, if a reset were to be activated at some point in the indicated detection period 401, this would be detected and the transfer of dataOut would be prevented by not setting stable high, but instead waiting until the reset clears and a new, stable dataIn value is available. Note that a reset that is activated during the period 401 can be detected, even if the reset detector flip-flop 203 has only just been re-initialised, so long as the SoC 1 uses resets that are synchronized with two flops, such that resets remain high for at least two cycles after being activated.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. An integrated-circuit device comprising:
   a source register in a first reset domain;
   a destination circuit located outside the first reset domain; and
   a reset checking circuit;
   wherein the reset checking circuit comprises:
      a buffer located outside the first reset domain and arranged for receiving data values output by the source register;
      a reset detector for detecting a reset of the first reset domain; and
      reset checking logic, located outside the first reset domain,
   wherein the reset checking logic is configured:
      to detect a new data value output by the source register, and, in response, to check whether a reset of the first reset domain has been detected by the reset detector; and
      to output, in dependence on whether a reset of the first reset domain has been detected by the reset detector, a control signal for controlling whether the destination circuit receives the new data value from the buffer; and
   wherein the reset detector comprises a resettable latch and is configured to output a signal to the reset checking logic, representative of whether a reset has been detected, by using a feedback path to hold a predetermined value in the resettable latch until the latch receives a reset signal, and to hold a reset value, different from the predetermined value, in the resettable latch after receiving a reset signal.

2. The integrated-circuit device of claim 1, wherein the destination circuit comprises a destination register and data flow logic configured to read the new data value from the buffer into the destination register when, and only when, the control signal output by the reset checking logic indicates that no reset of the first reset domain has been detected by the reset detector.

3. The integrated-circuit device of claim 2, wherein the data flow logic is further configured to output a ready signal to the reset checking logic for indicating when the destination circuit is ready to read a data value.

4. The integrated-circuit device of claim 1, wherein the reset checking logic is configured to cause the buffer to hold the new data value in the buffer at least until a ready signal is received by the reset checking logic from the destination circuit.

5. The integrated-circuit device of claim 1, wherein the buffer is in a different clock domain from the destination circuit.

6. The integrated-circuit device of claim 1, further comprising a bus connecting the buffer to the destination circuit, wherein the reset checking logic and the destination circuit together comprise a bus synchronizer.

7. The integrated-circuit device of claim 1, wherein the buffer and the reset checking logic are both located in a second reset domain, different from the first reset domain.

8. The integrated-circuit device of claim 1, wherein the buffer is configured to hold each new data value it receives from the source register while the reset checking logic checks whether a reset of the first reset domain has been detected by the reset detector.

9. The integrated-circuit device of claim 1, wherein the buffer comprises:
 a buffer register comprising one or more flip-flops; and
 a feedback path for holding a data value in the buffer register while the reset checking logic checks for a reset,
wherein:
 the feedback path comprises a multiplexer arranged to output to the buffer register, wherein the multiplexer is further arranged to receive data values output by the source register at a first input of the multiplexer and to receive an output of the buffer register at a second input of the multiplexer;
 the multiplexer comprises a select line that is connected to the reset checking logic; and
 the reset checking logic is configured to use the select line to set the multiplexer for receiving a new data value from the source register into the buffer at a first time, and for holding a data value in the buffer over a plurality of clock cycles at a second time.

10. The integrated-circuit device of claim 1, wherein the reset detector comprises a synchronizer arranged to receive an output of the resettable latch and to output a signal to the reset checking logic.

11. The integrated-circuit device of claim 1, wherein:
 the feedback path comprises a multiplexer arranged to output to the resettable latch, wherein the multiplexer is further arranged to receive the predetermined value at a first input of the multiplexer and to receive an output of the resettable latch at a second input of the multiplexer;
 the multiplexer comprises a select line that is connected to the reset checking logic; and
 the reset checking logic is configured to use the select line to set the multiplexer for receiving the predetermined value into the resettable latch at a first time, and for holding the predetermined value in the resettable latch, until the resettable latch is reset, at a second time.

12. The integrated-circuit device of claim 1, wherein the resettable latch is configured to change the output to the reset value when the resettable latch is reset, and wherein the feedback path is arranged to hold the reset value in the resettable latch until the reset detector is re-initialised to the predetermined value.

13. The integrated-circuit device of claim 1, wherein the reset checking logic is configured to re-initialise the reset detector in response to detecting a change of data value in the source register.

14. The integrated-circuit device of claim 1, wherein the reset checking logic is configured to detect new data values output by the source register by comparing an output of the source register with an output of the buffer.

15. The integrated-circuit device of claim 14, wherein the reset checking logic comprises an XOR gate arranged to receive an output of the source register at a first input of the XOR gate and to receive an output of the buffer at a second input of the XOR gate, wherein the output of the XOR gate is connected, directly or indirectly, to an input of the reset checking logic.

16. The integrated-circuit device of claim 15, wherein the reset detector comprises a synchronizer arranged to receive the output of the XOR gate and to output a signal to the reset checking logic.

17. The integrated-circuit device of claim 1, wherein the reset checking logic implements a finite state machine, wherein the finite state machine has:
 an idle state in which the finite state machine is ready to detect a new data value output by the source register; and
 a wait state, reached from the idle state when the finite state machine receives a signal indicating the detection of a new data value, in which the finite state machine remains for at least a delay period.

18. The integrated-circuit device of claim 17, wherein the delay period is equal to or greater than a maximum time interval between the finite state machine entering the wait state and the reset detector outputting a signal to the finite state machine representative of a detected reset when a reset has occurred.

19. The integrated-circuit device of claim 17, wherein the delay period is equal to a number of clock periods greater than or equal to the number of flip-flops arranged in series between an output of a resettable latch in the reset detector and an input to the reset checking logic for receiving a signal from the reset detector indicating the detection of a new data value.

20. The integrated-circuit device of claim 17, wherein:
 the finite state machine has a checking state, reached from the wait state, in which the finite state machine checks whether a reset of the first reset domain has been detected by the reset detector;
 wherein the finite state machine has a push state, reached from the checking state when no reset has been detected by the reset detector, in which the finite state machine outputs the control signal for causing the destination circuit to receive the new data value from the buffer; and
 wherein the finite state machine is configured, when a reset has been detected by the reset detector, to move from the checking state to the wait state.

* * * * *